United States Patent [19]
Lee et al.

[11] Patent Number: 5,920,670
[45] Date of Patent: Jul. 6, 1999

[54] MULTIPLE ALIGNMENT CONNECTOR FERRULE

[75] Inventors: Nicholas A. Lee, Woodbury; Scott Anthony Igl, St. Paul, both of Minn.

[73] Assignee: 3M Innovative Properties Company, St. Paul, Minn.

[21] Appl. No.: 08/874,243

[22] Filed: Jun. 13, 1997

Related U.S. Application Data

[63] Continuation-in-part of application No. 08/660,296, Jun. 7, 1996, Pat. No. 5,727,097.

[51] Int. Cl.⁶ .................................................... G02B 6/38
[52] U.S. Cl. ................................................ 385/78; 385/60
[58] Field of Search .................................. 385/78, 60, 53, 385/54, 55, 59, 63, 65, 71, 76, 72, 83

[56] References Cited

U.S. PATENT DOCUMENTS

| | | |
|---|---|---|
| 4,784,457 | 11/1988 | Finzel . |
| 5,276,755 | 1/1994 | Longhurst . |
| 5,287,426 | 2/1994 | Shahid . |
| 5,420,952 | 5/1995 | Katsura et al. . |
| 5,430,819 | 7/1995 | Sizer, II et al. . |
| 5,500,915 | 3/1996 | Iwatsuka et al. . |
| 5,619,604 | 4/1997 | Shiflett et al. ............................ 385/59 |
| 5,727,097 | 3/1998 | Lee et al. ............................ 385/71 X |
| 5,778,123 | 7/1998 | Hagan et al. ............................ 385/76 |

FOREIGN PATENT DOCUMENTS

| | | |
|---|---|---|
| 0 485 196 A2 | 5/1992 | European Pat. Off. . |
| 0 514 722 a1 | 11/1992 | European Pat. Off. . |

Primary Examiner—Phan T. H. Palmer
Attorney, Agent, or Firm—Nestor F. Ho; H. Sanders Gwin, Jr.

[57] ABSTRACT

An optical fiber connector ferrule that satisfies the existing need for providing an easy to manufacture, inexpensive optical connector having multiple alignment methods is provided. In particular, an optical fiber connector ferrule having a fiber engaging and alignment surface for engaging and aligning at least one optical fiber is provided. The ferrule also has a connector engagement surface. Additionally, the connector ferrule of the present invention has the capability of providing multiple alignment methods for providing compatibility with many different connector devices. Examples of the multiple alignment methods include ball and socket alignment, pin and socket alignment, and edge alignment methods.

23 Claims, 5 Drawing Sheets

MULTIPLE ALIGNMENT CONNECTOR FERRULE

RELATED APPLICATIONS

The present invention is related to U.S. patent application Ser. No. 08/660,358, U.S. Pat. No. 5,790,733 entitled, Optoelectronic Device Receptacle and Method of Making Same; U.S. patent application Ser. No. 08/614,412 now U.S. Pat. No. 5,778,123 entitled, Alignment Assembly for Multifiber or Single Fiber Optical Cable Connector, and is a continuation-in-part of U.S. patent application Ser. No. 08/660,296 entitled, Pull-Proof Fiber Optic Array Connector issued as U.S. Pat. No. 5,727,097 on Mar. 10, 1998, all of which are assigned to the Assignee of the present invention and the disclosures of which are herein incorporated by reference.

FIELD OF THE INVENTION

The present invention relates generally to connectors for optical fibers. In particular, the present invention relates to a multiple alignment connector ferrule for an optical fiber cable connector.

BACKGROUND OF THE INVENTION

Optical fiber ribbon cables are well known for the transmission of optical signals. Use of optical cables, including optical fiber ribbon cables, has generally been limited to long haul trunking installations where the improved transmission characteristics of the optical fibers justify the greater expense in typical difficulty associated with their manufacturing and installation. As demands on communication media continue to increase, the advantages of using optical cable for transmission of signals across shorter distances or, for interconnecting local devices, continues to grow. With this growth has come a need to connect fiber optic ribbon cables to a multiplicity of devices.

Much development work has been devoted to the provision of practical, low loss glass materials and production techniques for producing glass fiber cable, such as optical fiber ribbon cables. Obviously, if fiber optic cables are to be used in practical signal transmission and processing systems, practical connectors for the connection and disconnection of fiber optic cables must be provided.

Of considerable relevance to the problem of developing practical fiber optic connectors is the question of optical transfer efficiency at the connector. Various factors affect the optic transfer efficiency at a connector including gap separation at the point of abutment, lateral separation due to axial misalignment, and thermal expansion characteristics of connectors.

Numerous optical cable connectors have been developed to aid in the connection of fiber optic ribbon cables. Examples of known multi-fiber connectors include those available under the trade designation the MAC from Berg Electronics and the MT from U.S. Conec. Further examples of optical connectors are illustrated in U.S. Pat. Nos. 5,420,952 to Katsura, et al.; 5,276,755 to Longhurst; 5,500,915 to Foley et al.; 4,784,457 to Finzell; 5,430,819 to Sizer, II, et al.; and 5,287,426 to Shahid.

Many of the known connectors have disadvantages associated with them. For example, as connectors increase in size to multiple fiber connectors exceeding ten or so fibers, problems with thermal expansion arise. One way to combat this problem has been to use ceramic connectors. This has the drawback, however, of increasing the cost of the connector and increasing the time and effort to manufacture the connector because of the cutting and polishing required of ceramic connectors. Another drawback to the known connectors is that they are of limited compatibility. For instance, an MT connector that utilizes alignment pins would not be compatible with a connector that utilizes alignment balls and sockets.

It would be desirable to provide a connector which is easy to manufacture, inexpensive, and compatible with multiple alignment methods.

SUMMARY OF THE INVENTION

The present invention is an optical fiber connector ferrule that satisfies the existing need for providing an easy to manufacture, inexpensive optical connector having multiple alignment methods. In particular, the present invention is an optical fiber connector ferrule having a fiber engaging and alignment surface for engaging and aligning at least one optical fiber. The ferrule also has a connector engagement surface. The connector ferrule of the present invention is preferably made of standard engineering thermoplastics. Additionally, the connector ferrule of the present invention has the capability of providing multiple alignment methods for providing compatibility with many different connector devices. Examples of the multiple alignment methods include ball and socket alignment, pin and socket alignment, and edge alignment methods.

DETAILED DESCRIPTION OF THE DRAWINGS

Figure 1:
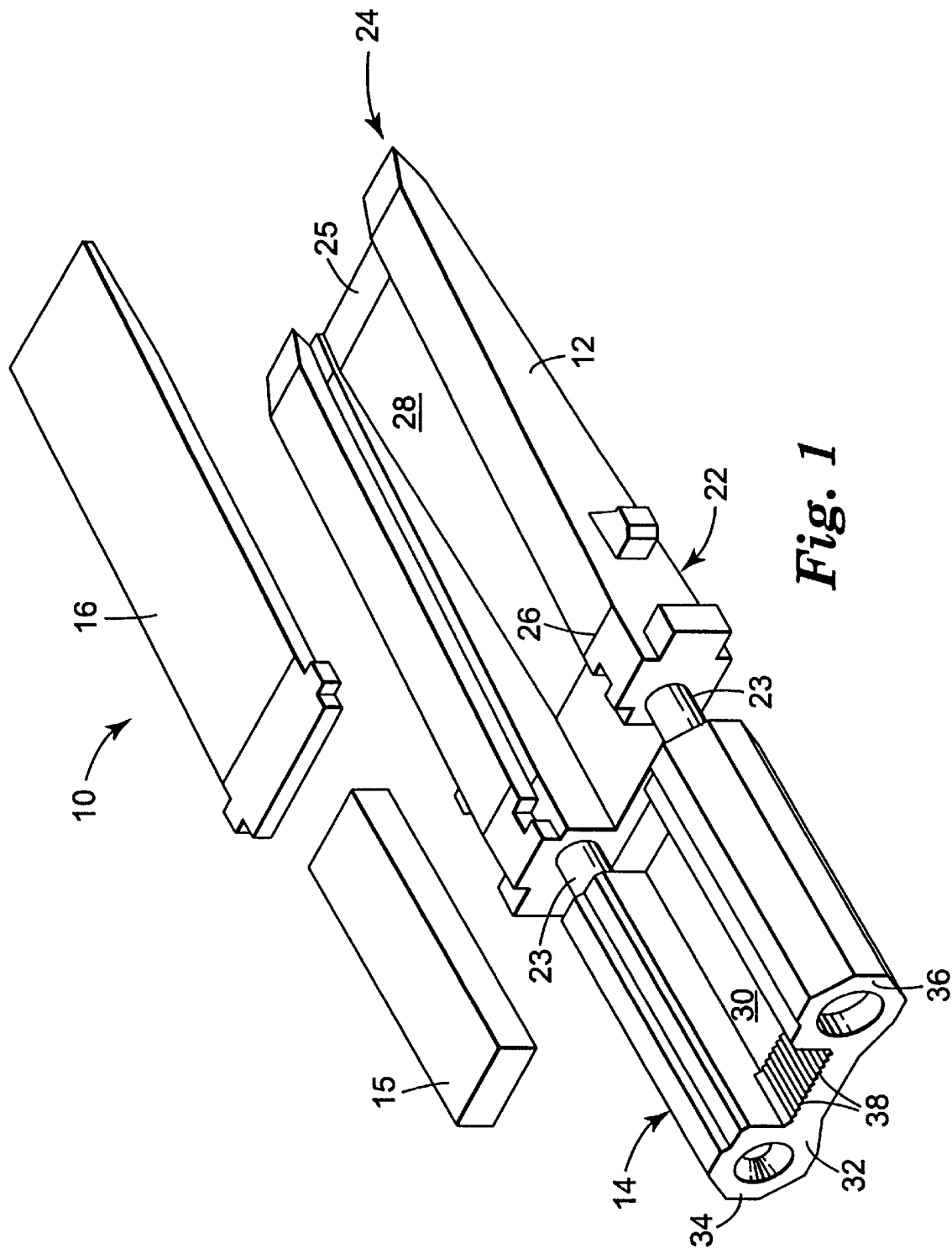
FIG. 1 is a perspective view of a multiple alignment optical connector according to the present invention.

The present invention is directed to a multiple alignment connector ferrule that provides an easy to manufacture, inexpensive optical connector capable of multiple alignment methods. FIG. 1 illustrates a multiple alignment connector assembly 10 according to the present invention. Connector assembly 10 is comprised of a connector body 12 and a fiber alignment block, or ferrule 14. Connector body 12 is provided to transition optical fibers from an optical fiber cable (not shown in FIG. 1) to ferrule 14. Ferrule 14 on the other hand, is provided to align the optical fibers and to directly interface with other compatible ferrules or with a number of different light emitting components such as LEDs, laser arrays, edge emitting lasers, super luminescent diodes, vertical cavity surface emitting lasers (VCSELs) and other surface emitting devices. Additionally, ferrule 14 may interface with a number of different optoelectronic detectors.

In the preferred embodiment of the present invention, a ferrule cover 15 and a connector body cover 16 are provided for protecting optical fibers positioned there beneath. It should be noted, however, that covers 15 and 16 could be eliminated without departing from the spirit or scope of the present invention.

In the preferred embodiment of the present invention, connector body 12 and ferrule 14 are molded from standard engineering thermal plastics using known injection molding procedures. By using standard thermal plastics, as opposed to other materials commonly used for connector ferrules such as ceramic, the cost of manufacturing ferrule 14 is greatly reduced. Additionally, the finishing steps for alignment details, such as grinding and polishing particularly required with ceramics, are eliminated.

Connector body 12 has a front end 22 and a back end 24. A pair of projections 23 project from front end 22 for engagement with ferrule 14. Connector body 12 tapers from front end 22 to back end 24 and begins to taper at bevel line 26. Tapered back end 24 has a transition platform 25 which provides for a gentle transition from a fiber optic ribbon cable to connector body 12. Beneath connector body 16 is a connector of body floor 28.

Ferrule 14 has a connector body engagement surface (not shown), an optical fiber engaging surface 30, an optical device interface surface 32 and first and second alignment members 34 and 36, respectively. Connector body engagement surface has a pair of receiving cavities (not shown) for receiving projections 23. A plurality alignment grooves 38 are formed in fiber engagement surface 30 for aligning optical fibers. In the preferred embodiment of the present invention, grooves 38 are V-shaped, however, other cross-sectional shapes could be chosen such as semi-circular or rectangular without departing from the spirit or scope of the present invention. As can be seen in FIG. 1, alignment grooves 38 are only found in a portion of the optical fiber engaging surface 30 adjacent to optical device interface surface 32. This provides the needed fiber alignment while reducing the cost and difficulty of the mold tooling. As can also be seen in FIG. 1, alignment grooves 38 may be located along the neutral axis of ferrule 14, thus minimizing the effect of angular misalignment of ferrule 14 on fiber alignment.

Figure 2:
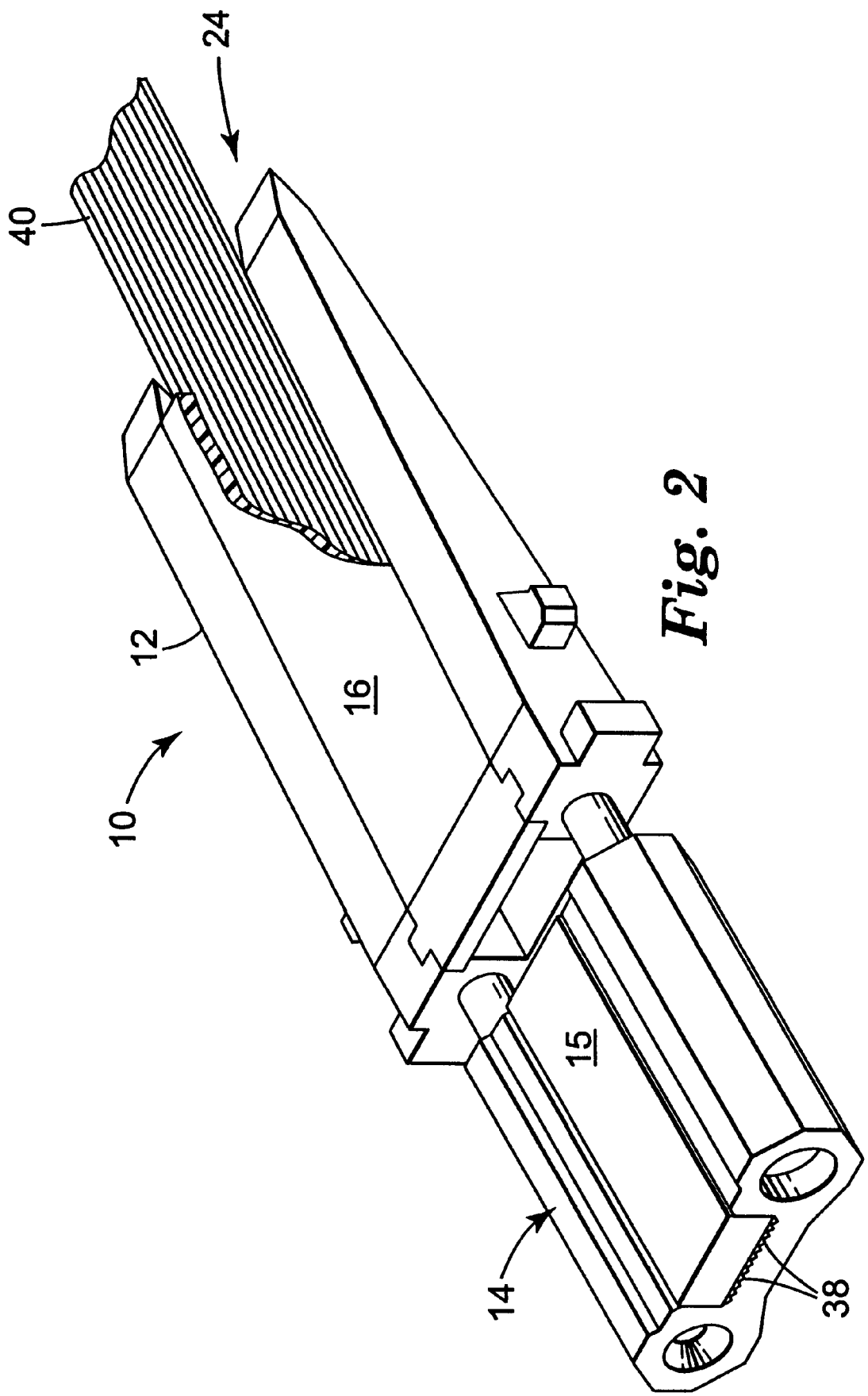
FIG. 2 is a perspective view of the connector of FIG. 1 having optical fibers contained thereon.

FIG. 2 is a perspective view of connector 10 having a plurality of optical fibers 40 retained beneath ferrule cover 15 and connector body cover 16 and bonded into alignment grooves 38. Bonding materials used in the present invention are commonly known, such as multi-part epoxy, or light curing adhesives such as, for example, those available from Ablestick Electronic Materials and Adhesives, Rancho Dominguez, Calif., under the trade designation LUXTRAK LCR 0603B+UV. Optical fibers 40 may also be potted in grooves 38. As can be seen in FIG. 2, optical fibers 40 are allowed to float between connector body floor 28 and connector body cover 16 and between back end 24 of connector body 12 and alignment grooves 38 of ferrule 14. This allows the fibers to buckle and bow without interference which assists in strain relief. For a more detailed discussion of strain relief features, reference may be made to co-pending U.S. application Ser. No. 08/660,296 now U.S. Pat. No. 5,727,097 entitled "Pull Proof Fiber Optic Array Connector," which is assigned to the Assignee of the present invention, the disclosure of which has been incorporated by reference.

Figure 3:
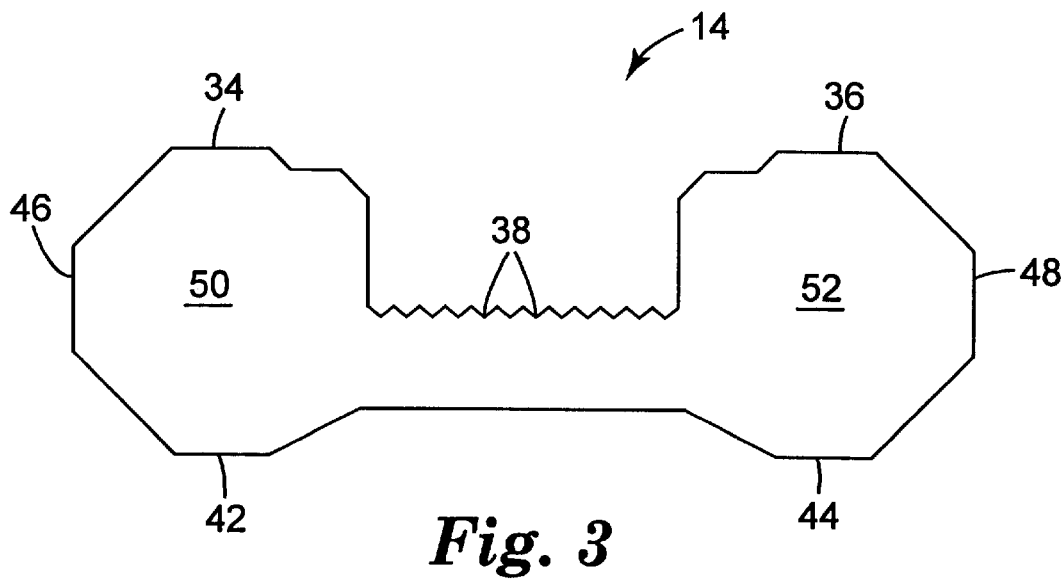
FIG. 3 is a front view of the connector ferrule according to the present invention.

FIG. 3 is a front view of connector ferrule 14 of the present invention. In the preferred embodiment of the present invention, first and second alignment members 34 and 36, are octagonally shaped members having bottom alignment edges 42 and 44 and side alignment edges 46 and 48, respectively. It should be noted, that first and second alignment members 34 and 36 could be many other shapes besides octagonal while still retaining the bottom and side alignment features without departing from the spirit or scope of the present invention such as hexagonal or rectangular. As can be seen in FIG. 3, first and second alignment members 34 and 36 have first and second alignment faces 50 and 52, respectively, for alignment purposes as will be described in detail below.

Figure 4:
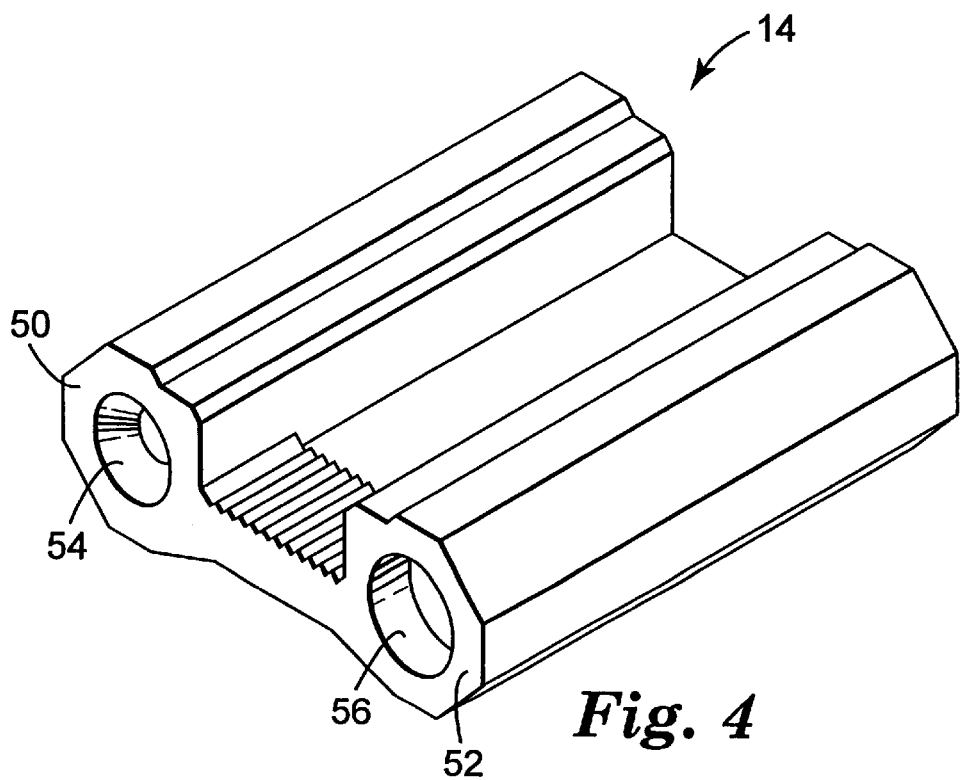
FIG. 4 is a perspective view of the connector ferrule according to the present invention prepared for ball and socket alignment.
Figure 7:
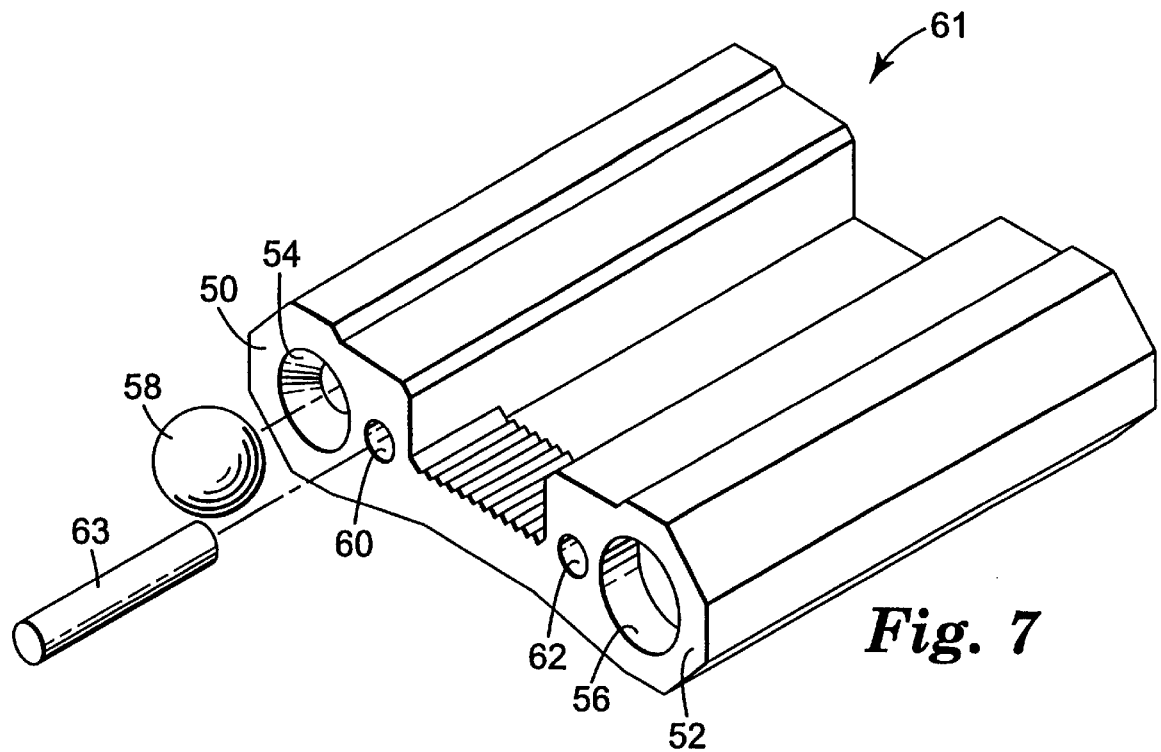
FIG. 7 is a perspective view of a connector ferrule according to the present invention capable of ball and socket, edge, and/or alignment pin alignment.

FIG. 4 is a perspective view of ferrule 14 according to the present invention prepared for ball and socket alignment. A first receiving cavity 54 is formed in first alignment face 50 and a second receiving cavity 56 is formed in second alignment face 52. First receiving cavity 54 is configured to form a chamfer for receiving and having secured inside it a portion of an alignment ball 58, as seen in FIG. 7. Second receiving cavity 56 is sized to receive a substantial portion of an alignment ball, as will be described in detail below. In the preferred embodiment of the present invention, alignment ball 58 is bonded into receiving cavity 54.

Alignment ball 58 is provided to precisely align ferrule 14 which in turn precisely aligns the individual optical fibers. Alignment ball 58 is preferably a highly precise steel ball bearing but could also be formed from other materials having the precision of a steel ball bearing such as tungsten carbide, ceramic, metal or plastic, such as liquid crystal polymer, without departing from the spirit or scope of the present invention. As stated above, alignment ball 58 is bonded into receiving cavity 54. The bonding can be achieved by commonly known adhesives. For a more detailed discussion of alignment assemblies, reference can be made to Applicant's co-pending application entitled, "Alignment Assembly for a Multi Fiber or Single Fiber Optical Cable Connector," which is assigned to the Assignee of the present invention.

Figure 5:
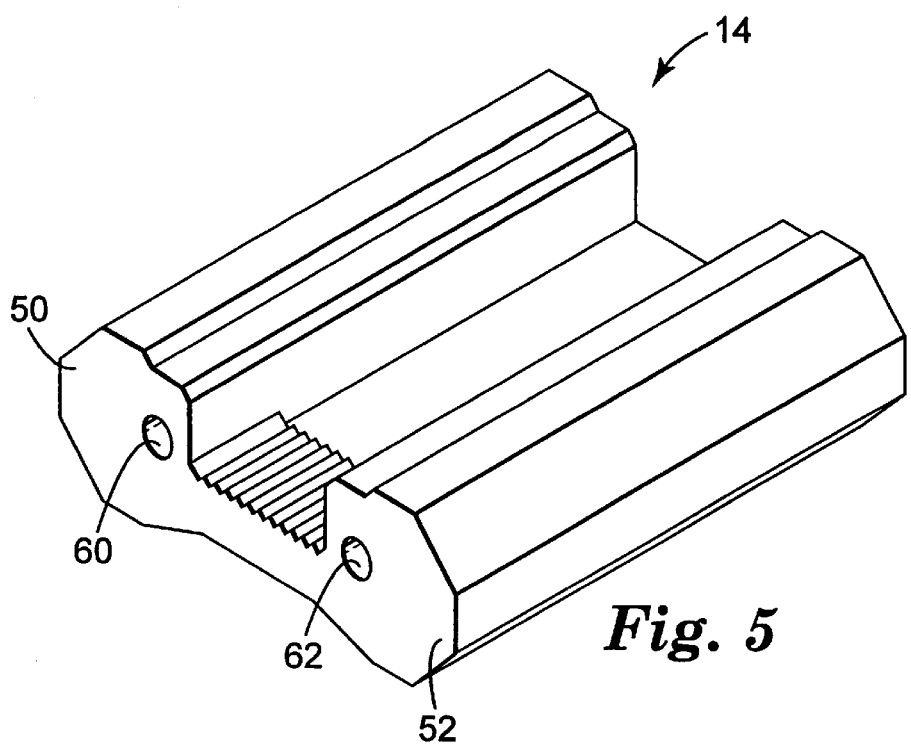
FIG. 5 is a perspective view of the connector ferrule according to the present invention prepared for alignment pin alignment.

FIG. 5 illustrates a perspective view of connector ferrule 14 according to the present invention prepared for alignment pin alignment. A first alignment pin receiving cavity 60 is provided in first alignment face 50 while a second alignment pin receiving cavity 62 is provided in second alignment face 52. As with the alignment ball assembly of FIG. 4, first alignment pin receiving cavity 60 is formed to receive and have bonded therein an alignment pin (not shown). Second receiving cavity 62 is sized to slidingly receive an alignment pin.

Figure 6:
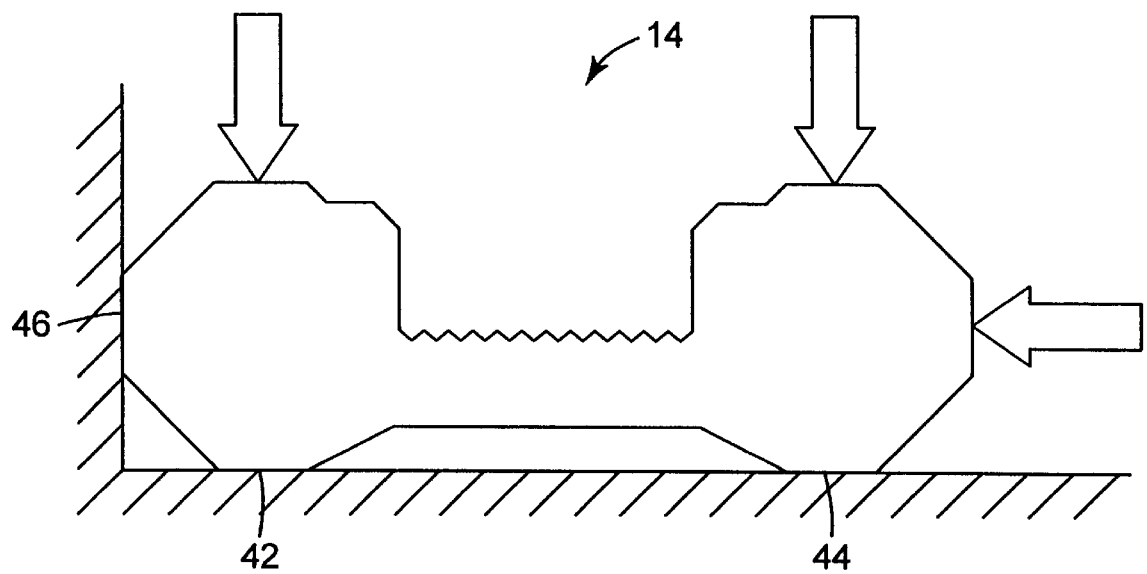
FIG. 6 is a front view of the connector ferrule according to the present invention in edge alignment.

FIG. 6 is a front view of connector ferrule 14 according to the present invention in edge alignment. As can be seen, ferrule 14 is aligned utilizing first and second bottom alignment edges 42 and 44 and first side alignment edge 46. First and second bottom alignment edges 42 and 44 and first and second side alignment edges 46 and 48 are formed within the same mold portion as alignment grooves 38, thus maximizing the positional accuracy of V-grooves 38 relative to the ferrule edges and thus allowing ferrule 14 to be aligned based on its external geometry.

Because the present invention is capable of multiple alignment methods, ferrule 14 is very versatile. The same ferrule can be used for applications needing edge alignment and for connecting to an MT Connector having cylindrical alignment pins. Another ferrule equipped for alignment ball alignment may also be used for edge alignment.

FIG. 7 is a perspective view of connector ferrule 61 adapted as a universal ferrule capable of edge alignment, ball and socket alignment and pin alignment. Ferrule 14 contains features previously described, and thus like elements are correspondingly identified. In this embodiment, a single ferrule may be adapted for use in any of the three above-identified alignment methods. To utilize ball and socket alignment, alignment ball 58 is bonded into first receiving cavity 54. To utilize pin alignment, an alignment pin 63 is inserted into first alignment pin receiving cavity 60. Pin 63 may be bonded in receiving cavity if desired. Finally, ferrule 61 may utilize edge alignment in the same manner as illustrated and described with respect to ferrule 14 in FIG. 6.

Ferrule 61 has the benefit of being adapted as a universal ferrule capable of the three alignment techniques described above. Therefore, a supplier would need only to stock ferrule 61 to accommodate a request from customers for edge alignment, ball and socket, or pin alignment. However, it should be pointed out that in order to accommodate both alignment pin receiving cavities 60 and 62 and ball and socket receiving cavities, 54 and 56, first and second alignment faces 50 and 52 are slightly larger than may be desired for certain applications.

Figure 8:
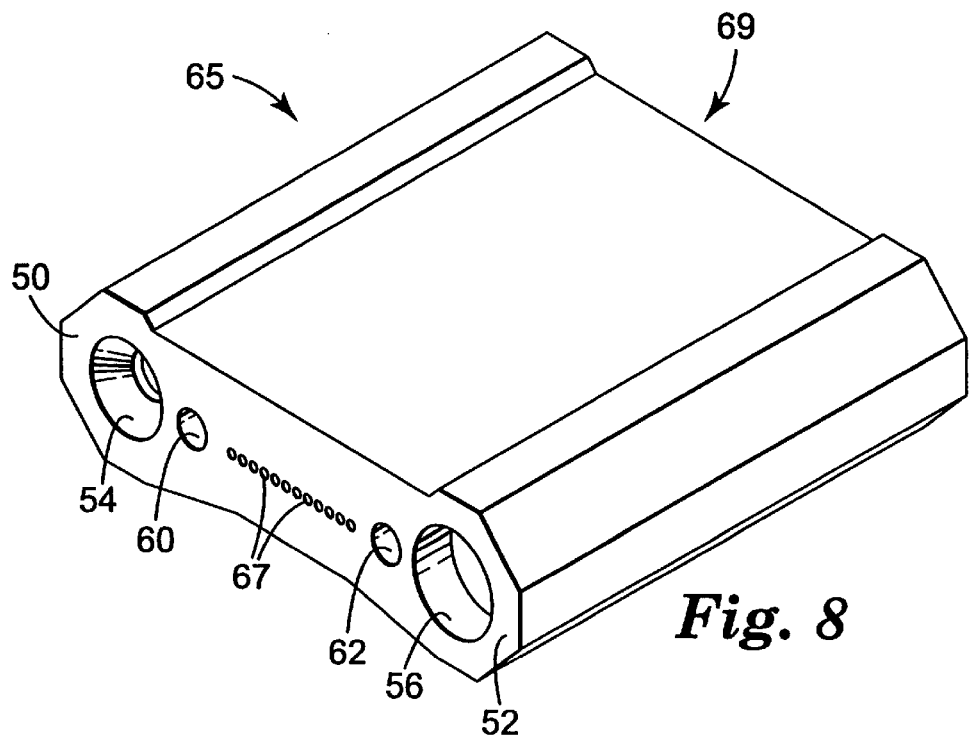
FIG. 8 is a perspective view of an alternative embodiment of the present invention.

FIG. 8 is a perspective view of an alternative embodiment of the present invention. A ferrule 65 is illustrated in FIG. 8 which contains many features of ferrule 14, and thus like elements are correspondingly identified. As seen in FIG. 8, ferrule cover 15 has become an integrally formed portion of ferrule 65. Grooves 38 have been removed and have been replaced with a plurality of holes 67. In this embodiment, optical fibers are inserted through back end 69, and inserted through the length of ferrule 65, until the ends of the fibers are positioned co-planar to optical device interface surface 32.

The invention is not to be taken as limited to all of the details thereof as modifications and variations thereof may be made without departing from the spirit or scope of the invention.

We claim:

1. An optical fiber connector ferrule comprising:

a fiber engaging and alignment surface for engaging and aligning at least one optical fiber, an optical device interface surface; and multiple alignment means for providing multiple alignment options for the connector ferrule.

2. The fiber connector ferrule as in claim 1 further comprising first and second openings formed in the optical device interface surface.

3. The connector ferrule as in claim 2 wherein the second opening is sized to slidingly receive an alignment pin.

4. The ferrule as in claim 3 wherein an alignment ball is retained in the first opening.

5. The connector ferrule as in claim 2 wherein the second opening is sized to slidingly receive an alignment ball.

6. The connector ferrule as in claim 2 wherein an alignment pin is retained in the first opening.

7. The connector ferrule as in claim 1 wherein the fiber engagement and alignment surface has at least one alignment groove.

8. The connector ferrule as in claim 7 further comprising alignment edges wherein the alignment edges are formed positionally accurate to the at least one alignment groove to allow alignment based on the external geometry of the connector ferrule.

9. The connector ferrule as in claim 8 further comprising first and second alignment ball openings formed in the optical device interface surface and first and second alignment pin openings formed in the optical device interface surface.

10. The connector ferrule as in claim 1 wherein the multiple alignment means comprises both alignment pin alignment and edge alignment.

11. The connector ferrule as in claim 1 wherein the multiple alignment means is selected from the set comprising: ball and socket alignment means, pin and socket alignment means, and connector ferrule edge alignment means.

12. The connector ferrule as in claim 1 wherein the multiple alignment means comprises both ball and socket alignment and edge alignment.

13. The connector ferrule as in claim 1 wherein the connector ferrule is made of molded thermal plastic.

14. A cross-compatible, multi-alignment optical fiber connector ferrule comprising:

a fiber engaging and alignment surface for engaging and aligning at least one optical fiber;

an optical device interface surface; and first and second alignment members, wherein the first alignment member has a first alignment face and at least one alignment edge and the second alignment member has a second alignment face and at least one alignment edge and wherein a first receiving cavity is formed in the first alignment face and a second receiving cavity is formed in the second alignment face.

15. The connector ferrule as in claim 14 further comprising a second receiving cavity formed in the first alignment face and a second receiving cavity formed in the second alignment face.

16. The connector ferrule as in claim 15 wherein an alignment pin is retained in the second receiving cavity of the first alignment face.

17. The connector ferrule as in claim 15 wherein the second receiving cavity of the second alignment face is sized to slidingly receive an alignment pin.

18. The connector ferrule as in claim 14 wherein the fiber engagement and alignment surface comprises at least one alignment groove.

19. The connector ferrule as in claim 18 wherein the alignment edges of the first and second alignment members and formed positionally accurate to the at least one alignment groove to allow alignment based on the external geometry of the connector ferrule.

20. The ferrule as in claim 14 wherein an alignment ball is retained in the first opening.

21. The connector ferrule as in claim 14 wherein the second opening is sized to slidingly receive an alignment ball.

22. The connector ferrule as in claim 14 wherein an alignment pin is retained in the first opening.

23. The connector ferrule as in claim 14 wherein the second opening is sized to slidingly receive an alignment pin.

* * * * *